Oct. 15, 1963 W. B. RALEY 3,106,784
EDUCATIONAL APPARATUS
Filed June 13, 1962 3 Sheets-Sheet 1

INVENTOR.
WALTER B. RALEY
BY
Leonard S. Knox
ATTY.

Oct. 15, 1963 W. B. RALEY 3,106,784
EDUCATIONAL APPARATUS
Filed June 13, 1962 3 Sheets-Sheet 2

INVENTOR.
WALTER B. RALEY
BY
Leonard S. Knox
ATT'Y.

FIG. 8, FIG. 9, FIG. 10, FIG. 11

United States Patent Office 3,106,784
Patented Oct. 15, 1963

3,106,784
EDUCATIONAL APPARATUS
Walter B. Raley, 855 W. Wellington Ave., Chicago, Ill.
Filed June 13, 1962, Ser. No. 202,120
5 Claims. (Cl. 35—9)

This invention relates to educational apparatus adapted for teaching factual information by means which may be regarded as based upon so-called "multiple choice" tests.

While apparatus of the general character aforesaid is well known, those with which I am familiar suffer from a major shortcoming namely, the ability of the trainee to memorize the pairing of a particular question with its answer so that, upon repetition of a given set of questions the trainee has so familiarized himself with the matching of a question and answer that the second or subsequent trial yields a grade not representative of his ability.

The present invention, therefore, has for its principal object an educational apparatus capable of facile rearrangement of the questions and answers in order to defeat the advantage the trainee may have otherwise gained by memorizing the juxtaposition of particular questions with their particular answers.

Another object is to provide apparatus as aforesaid so constructed and arranged that a particular set of questions may be differently oriented with their respective answers simply by interchanging one card bearing the set of questions and answers with another card on which the same questions appear but the answers are differently oriented, and by using the same base or receptor for all of the cards.

A further object lies in accomplishing the foregoing aim with the use of an extremely simple, tamperproof receptor for the cards which requires no manipulation of mechanical parts or components of an electrical circuit.

Another object is to provide apparatus as aforesaid in which inexpensive, low voltage circuitry is employed so as to be made commercially available at a popular price, to avoid excessive current drain and to be absolutely safe in the hands of a child.

Other objects and advantages will become apparent from the ensuing description which, taken with the accompanying drawings, discloses a preferred mode of carrying the invention into practice.

In these drawings:

Figures 8, 9, 10, 11:
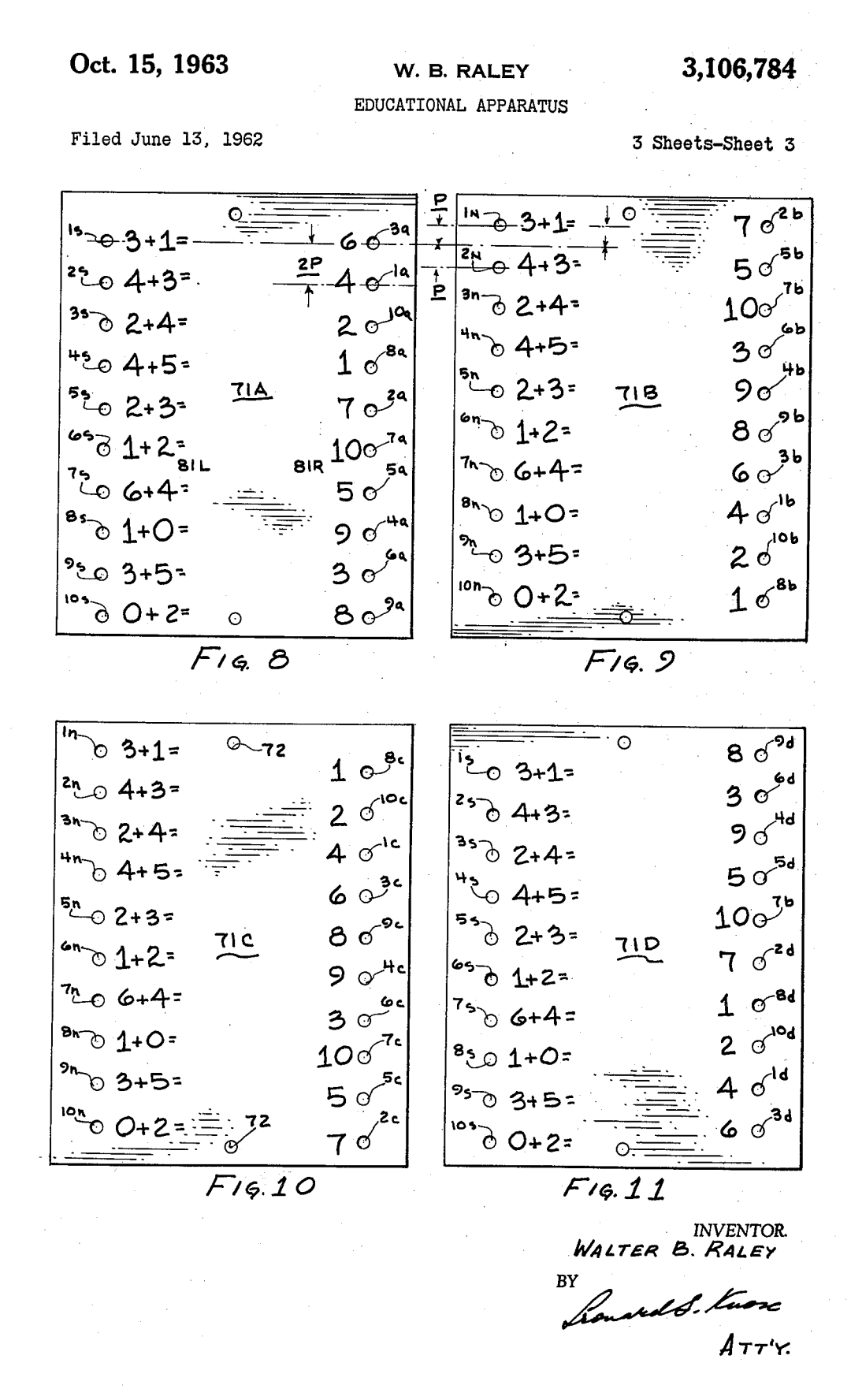

FIGS. 8 to 11 show several forms of the interchangeable cards.

Figure 1:
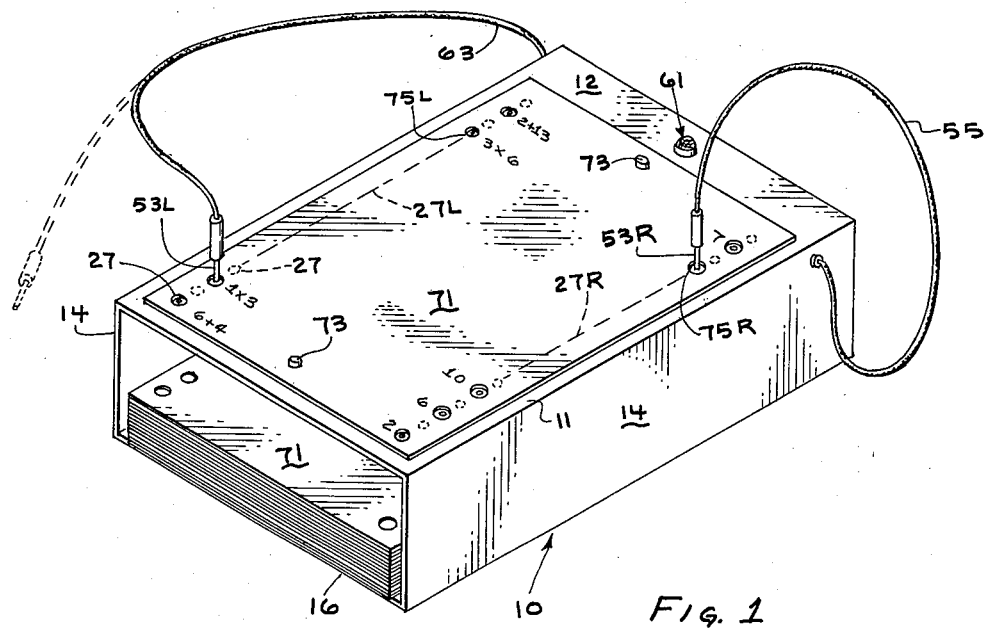
FIG. 1 is a perspective view of the invention apparatus in a preferred form.
Figure 2:
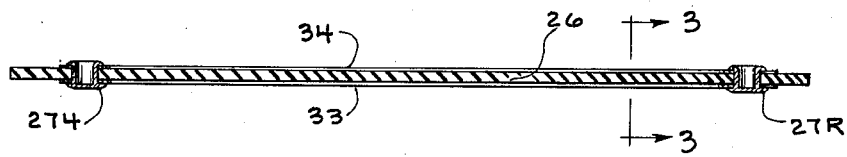
FIG. 2 is a transverse cross section of the contact board and certain circuitry associated therewith.
Figure 3:
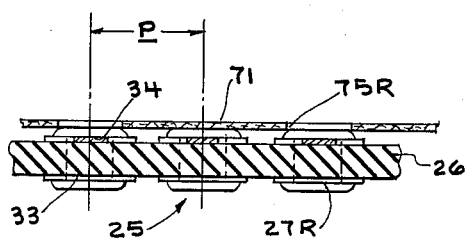
FIG. 3 is a cross section taken on the line 3—3 of FIG. 2.

In the interest of succinctness the words "questions and answers" will sometimes be referred to herein as "problems" even though the invention is not to be construed as limited to the solution of "problems" in the accepted sense. That is to say, the questions may relate to geography, history, botany, etc. requiring words rather than figures for answers.

Broadly regarded the invention apparatus comprises a base or cabinet upon the top of which is a panel supporting two banks of contacts at each side thereof, referred to as the left bank and right bank. These contacts are interconnected in some random fashion such that a circuit may be completed between a selected, unique left bank contact and a matching unique, right hand contact. That is to say the answers are not aligned horizontally with the respective questions. A source of power, e.g., a dry cell, a lamp and a pair of left and right hand probes are so interconnected that when the left hand probe is placed on a selected contact, i.e., question, and the right hand probe is placed on the matching, right hand, answer contact the lamp will light. Contrariwise, unless the matching right hand contact has been selected, the lamp will remain dark. Means other than fixed contacts and probes may be employed, e.g., a push button individual to each question and answer. A plurality of coded cards is provided to be placed singly and selectively over the two banks of contacts and there temporarily located by any suitable means. Each card is punched on the left and right margins with a column of perforations, the number whereof is some sub-multiple of the totality of left hand contacts and the right hand column comprises a like sub-multiple. The columns of perforations on each different card differ in vertical location so that when a card is placed in operative position the perforations will expose sets of left and right contacts in different combinations, regarded as components of electrical circuits, to vary the physical orientation of the questions and answers. Each card bears a printed set of questions on the left, there being one question individual to each left hand perforation, and a printed set of answers on the right, there being one answer individual to each right hand perforation. By utilizing a sufficient plurality of contacts in each column and a corresponding sub-multiple arrangement of perforations on a plurality of cards there may be obtained, within the practical lower limit of contact size and practical upper limit of depthwise dimension for the base of the apparatus, a rather large number of combinations of questions and answers. The spacing of the perforations on the cards need not be uniform since the same may provide still other combinations when grouped non-uniformly. Moreover both sides of the card may be printed, thereby doubling the selection of cards. By mounting the contacts on a removable panel these latter also may be wired in a variety of combinations and being interchangeable, the number of available combinations is multiplied further. Additionally, by making provision for locating the card in different, vertically shifted positions on the base, i.e., different locations relative to the banks of contacts, the number of combinations is still further multiplied.

Figure 4:
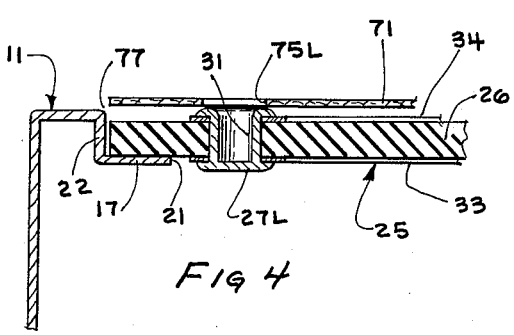
FIG. 4 is a cross sectional detail to show the relation between the interchangeable question and answer board and the contacts.
Figure 5:
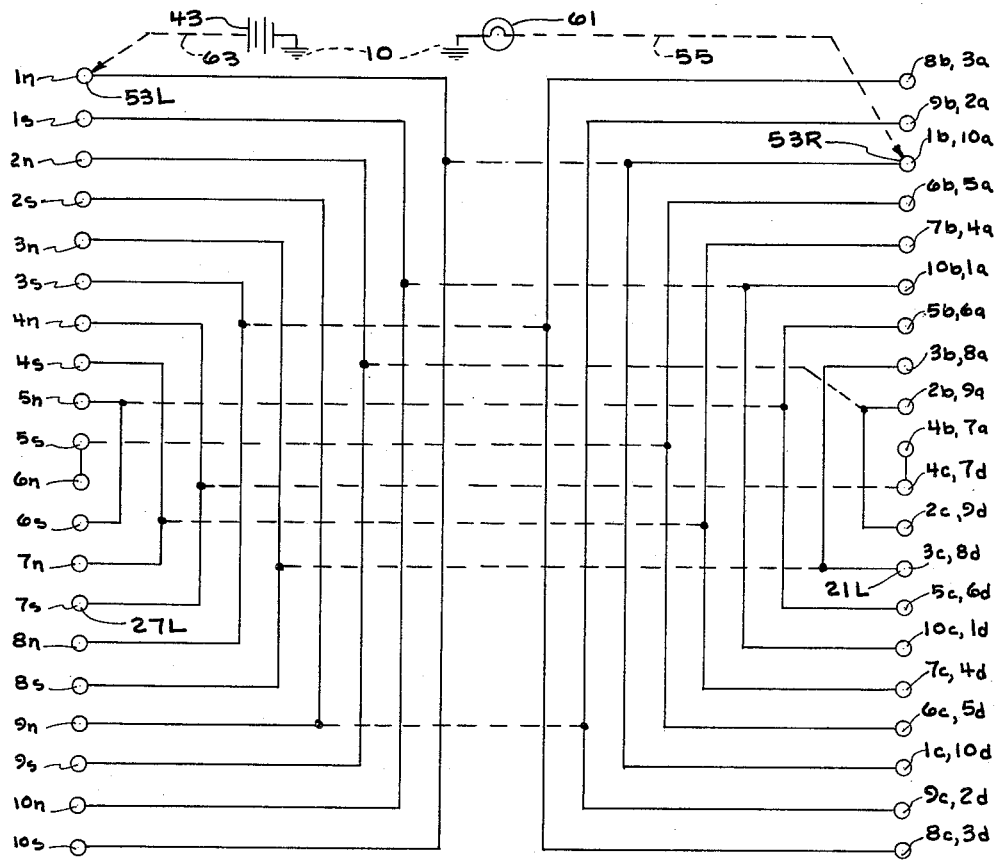
FIG. 5 is a schematic showing of the electrical circuits.

Thus, adverting to the drawings I have shown, by way of example, a base or cabinet 10, preferably of sheet metal, including narrower top marginal portions 11 on the sides and front end, a wider top portion 12, side walls 14—14 and a bottom wall 16. The top marginal portions 11 and top portion 12 are formed, as in FIG. 4, into a flange 17 defining a rectangular opening 21.

Adapted to be inserted and removed from the space defined by the flange 17 and the depending portion 22 of the base is a contact and circuit assembly 25 (FIGS. 2, 3, 4 and 5). This latter comprises a thin, flat board 26 of dielectric material, e.g., compressed fiber board, into which are secured two banks of contacts 27L and 27R on the left and right respectively. The contacts 27 may be of any suitable form, a preferred one being shown as a conventional eyelet inserted through a hole and crimped to provide a recess 31 to receive the end of the probes. In the example there are twenty contacts in each bank although, as explained above, such number may vary. The interconnection between the contacts of the left and right banks is preferably by means of a so-called printed circuit indicated typically at 33 and 34. For convenience of illustration the thickness of such circuits has been exaggerated. Since such circuit arrangements are well known it is deemed superfluous to elaborate thereupon.

If it is not desired to have interchangeable panels 25 then the same may be cemented or otherwise secured to the flange 17. Furthermore other equivalent arrangements may be provided for locating the board 26 with respect to the base 10.

Before proceeding to a treatment of the interchangeable problem cards and the electrical components cooperative therewith the remainder of the electrical circuitry will be described.

Figure 7:
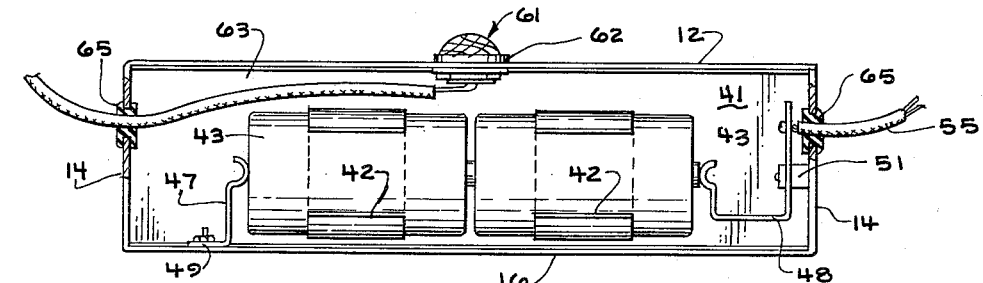
FIG. 7 is a view taken in the direction of the arrows 7—7 of FIG. 6.

Toward the rear of the cabinet 10 (FIGS. 6 and 7) there is provided a transverse vertical partition 41, the same being attached to the walls and bottom of the cabinet by any common expedient. Secured to the partition 4 is a pair of resilient clips 42, each receiving a common flashlight cell 43 arranged in series and maintained in contact by spring terminals 47 and 48. The former is grounded at 49 to the bottom wall 16 and the latter is carried on an insulating stud 51. One of a pair of probes, namely 53R, is connected by a flexible conductor 55 to the terminal 48. A lamp 61 in a suitable socket 62 is mounted on the marginal portion 12 or other convenient location, one side of the socket being grounded thereto and the other side thereof being connected by a lead 63 to the left probe 53L. Desirably the leads 55 and 63 are protected by rubber grommets 65.

From the foregoing it will have become apparent that a circuit to the lamp will be completed when the probes 53L and 53R are properly matched in a manner to be described, whereby to light the lamp for indicating visually that the selected answer is the correct one for the selected question. Obviously audible signalling means may be used or the signal may be made evident at a remote point, e.g., at the trainer's desk. Similarly the circuit, when successfully completed, may be made to operate a recording device beyond the control of the trainee.

The interchangeable problem cards 71 are desirably of reasonably rigid cardboard capable of receiving printing, and are provided with a pair of locating holes 72—72 engageable over dowels 73—73 protruding from the front flange 17 and the flange portion 12 whereby, when the card is located with respect thereto, the left and right columns of perforations 75L and 75R will have been positioned in register with certain of the banks of contacts 27L and 27R. The arrangement is such that when a card is deposited on the contacts 27 a marginal gap 77 remains for reception of a finger nail in order that the card may be expeditiously removed. Alternatively a notch in one edge of the card may function in the same manner.

For convenience of exposition four cards are shown (FIGS. 8 to 11) for association with the twenty contacts 27L and 27R in the left and right banks respectively.

Taking the spacing or pitch of the contacts 27L or 27R in each bank as P (FIG. 3) the several cards will be provided with two coordinated columns of perforations 81L and 81R spaced apart a distance 2P. One column may be shifted as an entirety by a distance P, as in FIGS. 8 and 9 for both columns; by a distance P for the right column (FIG. 10), or a distance P for the left column, thereby yielding four possible combinations of physical location of questions and answers. The perforations may be arranged otherwise, for example in pairs spaced a distance P with each pair spaced from an adjacent pair by a distance 3P.

Each of the cards shown by way of example bears on the left ten problems of simple addition although the number thereof may be more or less, and the questions may be other than computative and, on the right, the ten correct answers in some indiscriminate arrangement, i.e., not directly opposite the problems to which each pertains. For convenience of description the perforations 81L are identified by the reference characters 1s to 10s (card 71A), 1n to 10n (card 71B), 1n to 10n (card 71C) and 1s to 10s (card 71D); the suffix letter n meaning "normal" position of the perforations and the suffix letter s meaning "shifted" position thereof. It will be observed that such shift is the distance P. The columns of perforations 81R are identified by the reference characters 1a to 10a (card 71A), 1b to 10b (card 71B), 1c to 10c (card 71C) and 1d to 10d (card 71D). It will be noted that these latter are in an indiscriminate array with the respective contacts 27L and 27R associated therewith connected in circuit in accordance with FIG. 5. As will be clear from this circuit there is a practically infinite number of ways in which the contacts 27L and 27R may be cross connected. Thus, assuming a particular card, say 71A, has been placed in position on the base and the trainee has selected a particular problem, say 4s, or 4+5=? the correct answer, 9, requires the trainee to place the prod 53L at 4s and the prod 53R at 4a. If he does so, a circuit is completed in a manner easily traceable on FIG. 5 and the lamp will light. If the trainee should select the wrong answer, the circuit "dead ends" and no signal is obtained. Similarly for any other problem or question selected at a left hand column of perforations. If desired both sides of the card may bear printed questions, thus doubling the selection thereof.

If one supposes that the trainee has practiced so frequently on a selected card, say 71A, as to have memorized all of the correct combinations, a final examination will be meaningless. Accordingly, the instructor will substitute a different card chosen from cards 71B, 71C and 71D or any other cards of the same character, namely, in which the questions and answers are traced differently through the circuit. Thus the trainee is exposed to a different arrangement and mnemonics is of no avail.

For example, assuming card 71C is substituted for card 71A the same problem assumed exemplificatively above, namely 4n, has its answer at 4c which is displaced downwardly six perforations from 4a (card 71A), and similarly for any other problem and any other card.

Figure 6:
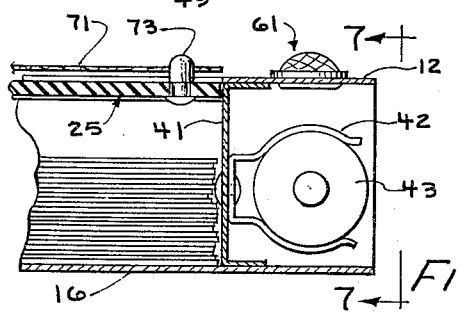
FIG. 6 is a cross sectional view to show details of the current supply and lamp.

For convenience the supply of cards 71 may be stored in the interior of the cabinet 10 (FIGS. 1 and 6).

While I have shown a particular embodiment of my invention, it will be understood, of course, that I do not wish to be limited thereto since many modifications may be made and I, therefore, contemplate by the appended claims to cover any such modifications as fall within the true spirit and scope of my invention.

I claim:

1. Educational apparatus of the class described comprising a base, a plurality of equally-spaced question contacts arranged in a bank at one side of the base, a like plurality of equally-spaced answer contacts arranged in a bank at the opposite side of the base, means for electrically insulating said contacts from each other, a card and means common to said card and base to locate said card in a predetermined position on said base, said card having a column of question perforations positioned adjacent one side, said plurality of question perforations being a sub-multiple of said question contacts and a plurality of answer perforations positioned adjacent the opposite side, said plurality of answer perforations being a sub-multiple of said answer contacts, said perforations being located to expose associated question contacts and answer contacts respectively, a plurality of questions displayed on said card, one individual to each question perforation and adjacent thereto, a plurality of answers displayed on said card, one individual to each answer perforation and adjacent thereto, the answers being arranged in an indiscriminate order as referred to an assumed regular order of questions, a plurality of conductors connecting each question contact with the answer contact related thereto, and electric circuit means including a source of current, signalling means and said banks of contacts whereby the circuit may be completed to energize the signalling means only when a selected question contact is conductively associated with the contact bearing the proper answer thereto.

2. The combination in accordance with claim 1 wherein said contacts are fixed and said circuit means includes a pair of manually-held prods adapted to be touched to the selected question and answer contacts to complete the circuit.

3. The combination in accordance with claim 1 further characterized in that a multiplicity of cards is made available, each card differing from the others in that the columns of either or both of the question and answer perforations are shifted with respect to their counterpart columns on other cards, the questions displayed on the cards being the same and arranged in the same order and the associated sets of answers displayed thereon being in a multiplicity of different indiscriminate orders corresponding to the multiplicity of cards.

4. The combination in accordance with claim 1, further characterized in that the banks of contacts are mounted on a board removably carried on said base, a plurality of conductors supported on said board, each one thereof joining a question contact with the associated answer contact, said conductors selectively forming a part of said electrical circuit means.

5. The combination in accordance with claim 4 further characterized in that said conductors are constituted as a printed circuit applied to the board.

References Cited in the file of this patent

UNITED STATES PATENTS

| | | |
|---|---|---|
| 1,860,895 | Marx | May 31, 1932 |
| 1,949,783 | Cleaver | Mar. 6, 1934 |
| 2,627,672 | Polton | Feb. 10, 1953 |